United States Patent
Gao et al.

(10) Patent No.: US 10,362,538 B2
(45) Date of Patent: Jul. 23, 2019

(54) WUR PACKETS GENERATION WITH LEGACY WIFI TRANSMITTER

(71) Applicant: Cisco Technology, Inc., San Jose, CA (US)

(72) Inventors: Zhigang Gao, Twinsburg, OH (US); Paul J. Stager, Akron, OH (US); Fred J. Anderson, Lakeville, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/663,467

(22) Filed: Jul. 28, 2017

(65) Prior Publication Data

US 2019/0037496 A1    Jan. 31, 2019

(51) Int. Cl.
| | |
|---|---|
| *H04W 52/02* | (2009.01) |
| *H04L 27/26* | (2006.01) |
| *H04W 72/04* | (2009.01) |
| *H04W 16/14* | (2009.01) |
| *H04L 5/00* | (2006.01) |
| *H04W 76/28* | (2018.01) |

(52) U.S. Cl.
CPC ....... *H04W 52/0225* (2013.01); *H04L 5/0053* (2013.01); *H04L 27/2613* (2013.01); *H04W 16/14* (2013.01); *H04W 72/0453* (2013.01); *H04W 72/042* (2013.01); *H04W 76/28* (2018.02)

(58) Field of Classification Search
CPC ............. H04W 52/0225; H04W 16/14; H04W 72/0453; H04W 76/28; H04W 72/042; H04L 5/0053; H04L 27/2613
See application file for complete search history.

(56) References Cited

U.S. PATENT DOCUMENTS

| | | | |
|---|---|---|---|
| 2010/0112950 A1 | 5/2010 | Haartsen et al. | |
| 2014/0126442 A1* | 5/2014 | Jafarian ............ | H04W 52/0212 370/311 |
| 2014/0187186 A1 | 7/2014 | Pursula et al. | |
| 2016/0198409 A1 | 7/2016 | Chakraborty | |
| 2017/0026907 A1 | 1/2017 | Min et al. | |
| 2018/0084501 A1* | 3/2018 | Mu ....................... | H04L 5/0007 |
| 2018/0152333 A1* | 5/2018 | Shellhammer ........ | H04L 1/0023 |
| 2018/0176053 A1* | 6/2018 | Park ........................ | H04L 27/04 |

* cited by examiner

*Primary Examiner* — Dady Chery
(74) *Attorney, Agent, or Firm* — Patterson + Sheridan, LLP

(57) ABSTRACT

Techniques are disclosed for generating 802.11 packets that simulate an 802.11ba Wake-Up Radio (WUR) packet by wireless access points (APs) that implement pre-802.11ba standards. According to one embodiment disclosed herein, a predefined bit stream including a plurality of data bits is evaluated. A data bit of the plurality is mapped to one of a plurality of subcarriers. A symbol is encoded in a data payload of a network packet based on the mapping of the data bit to the subcarrier. The symbol simulates an on-off key (OOK)-modulated symbol in a WUR sequence. The network packet is transmitted to a client device.

17 Claims, 5 Drawing Sheets

WUR PACKETS GENERATION WITH LEGACY WIFI TRANSMITTER

TECHNICAL FIELD

Embodiments presented in this disclosure generally relate to wireless communications, and more specifically to generating packets that simulate an 802.11ba Wake-Up Radio (WUR) packet to a WUR-enabled client device.

BACKGROUND

The 802.11ba standard provides a WUR operation that allows a wireless access point (AP) to transmit a WUR packet to a client device when a main radio of the client device has data to receive. A client device that supports the 802.11ba standard has a secondary radio that generally consumes a relatively low amount of power and thus can remain active while the main radio is in an inactive state. When the secondary radio receives the wake-up packet from the AP, the secondary radio, in turn, sends a signal to trigger an active state in the main radio. This technique allows the client device to conserve power and latency, which addresses power consumption concerns for devices such as Internet-of-Things (IoT) devices. Particularly, IoT devices, while "always on," do not typically require the main radio to be active unless wireless data is being sent to or from the device.

Typically, an AP that supports the 802.11ba standard generates the WUR packet using on-off keying (OOK) modulation, a scheme that represents data by the presence or absence of a carrier wave. Likewise, the secondary radio on a WUR-enabled client device recognizes a WUR packet based on the OOK modulation of the packet. However, an AP that implements 802.11 standards preceding ba are generally incapable of OOK modulation without significant modification to the underlying hardware of the AP. Therefore, 802.11 legacy APs may be unable to leverage WUR operations.

BRIEF DESCRIPTION OF THE DRAWINGS

So that the manner in which the above-recited features of the present disclosure can be understood in detail, a more particular description of the disclosure, briefly summarized above, references embodiments, some of which are illustrated in the appended drawings. Note, however, that the appended drawings illustrate only typical embodiments of this disclosure and should not be considered limiting of its scope, for the disclosure may admit to other equally effective embodiments.

To facilitate understanding, identical reference numerals have been used, where possible, to designate identical elements that are common to the figures. Elements disclosed in one embodiment may be beneficially utilized on other embodiments without specific recitation.

DESCRIPTION OF EXAMPLE EMBODIMENTS

Overview

Figure 1:
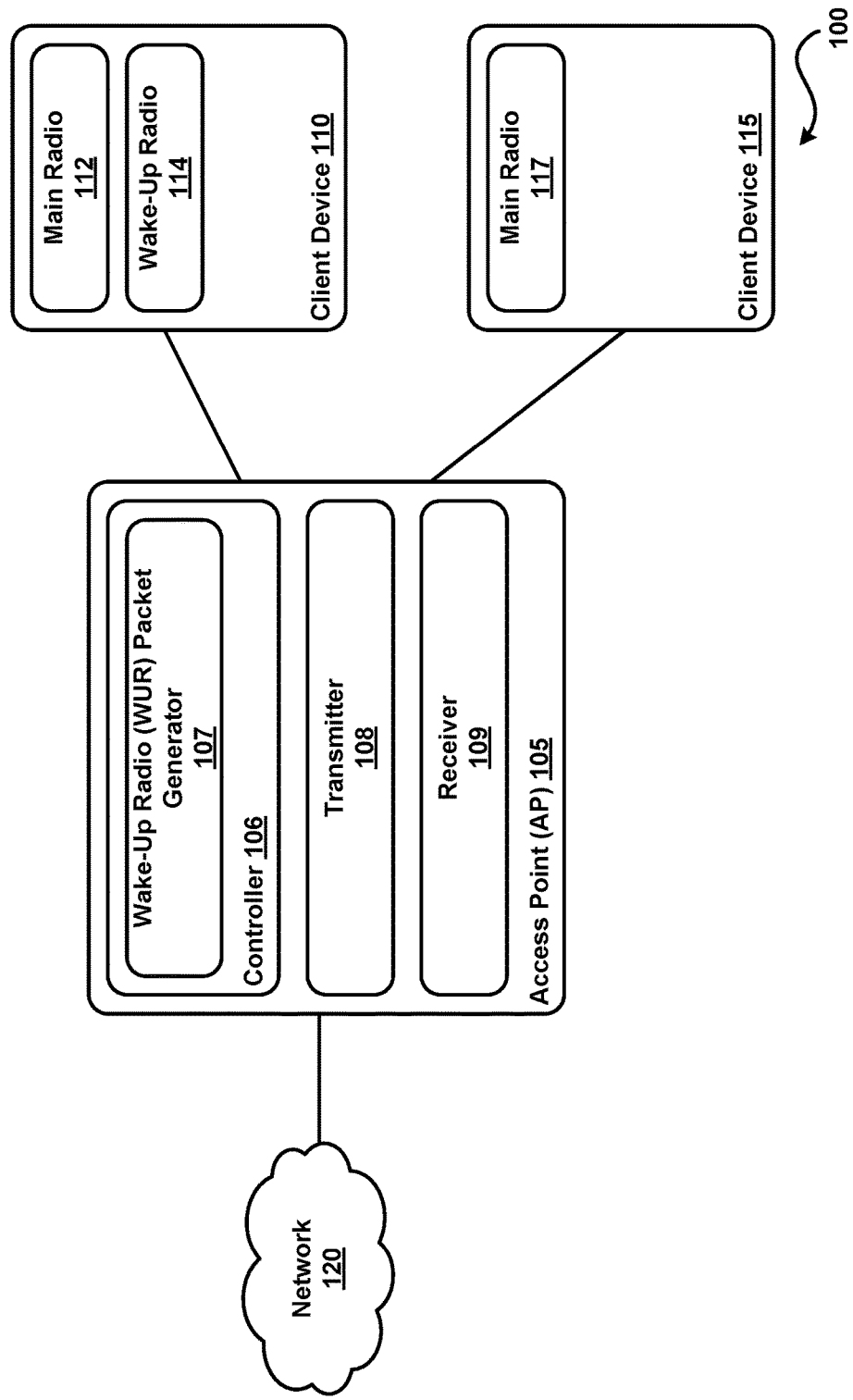
FIG. 1 illustrates an example computing environment including a non-802.11ba wireless access point (AP) that generates packets simulating on-off keying symbols (OOK), according to one embodiment.

One embodiment presented herein discloses a method. The method generally includes mapping, by a wireless access point, at least a predefined bit stream that includes a plurality of data bits to one or more of a plurality of subcarriers. The method also includes encoding, in a data payload of a network packet, a symbol based on the mapping of the data bit to the one or more of a plurality of subcarriers. The symbol simulates an on-off key (OOK)-modulated symbol in a wake-up radio (WUR) sequence. The network packet is transmitted to a client device.

Another embodiment presented herein discloses a computer-readable storage medium storing instructions, which, when executed on a processor, performs an operation. The operation itself generally includes mapping, by a wireless access point, at least a predefined bit stream that includes a plurality of data bits to one or more of a plurality of subcarriers. The operation also includes encoding, in a data payload of a network packet, a symbol based on the mapping of the data bit to the one or more of a plurality of subcarriers. The symbol simulates an on-off key (OOK)-modulated symbol in a wake-up radio (WUR) sequence. The network packet is transmitted to a client device.

Yet another embodiment disclosed herein discloses a network device including a transmitter. The transmitter is generally configured to map at least a predefined bit stream that includes a plurality of data bits to one or more of a plurality of subcarriers. The transmitter encodes, in a data payload of a network packet, a symbol based on the mapping of the data bit to the one or more of a plurality of subcarriers. The symbol simulates an on-off key (OOK)-modulated symbol in a wake-up radio (WUR) sequence. The network packet is transmitted to a client device.

Example Embodiments

An access point (AP) implementing the 802.11ba standard generates a Wake-Up Radio (WUR) packet using on-off keying (OOK) modulation. Generally, OOK modulation refers to a form of amplitude-shift keying (ASK) where a large (or full) amplitude carrier represents an ON (or 1) symbol and where a small (or zero) amplitude carrier represents an OFF (or 0) symbol. An 802.11 ba AP can send a WUR packet to a client device. The client device includes a secondary radio receiver that operates continuously for receiving WUR packets. Once a packet is received, the secondary radio serves as a switch to wake up a main radio for subsequent 802.11 messaging.

However, APs that implement 802.11 standards preceding 802.11 ba are generally not configured to perform OOK modulation. For instance, many legacy APs provide an orthogonal frequency division multiplexing (OFDM) transmitter that is incapable of performing OOK modulation directly. More particularly, the OFDM transmitter typically would not be able to send 802.11 ba WUR packets to a client device using traditional methods, as the secondary radio on the client device would not recognize symbols sent using non-OOK modulation.

Embodiments presented herein disclose techniques for sending WUR packets to a WUR-enabled client device via a non-802.11ba wireless AP. More specifically, the AP generates packets that simulate ON and OFF symbols provided by OOK modulation. In one embodiment, the AP includes predefined mappings between ON/OFF symbols and OFDM data bits, which are used to represent an OOK symbol in a payload of a standard 802.11 packet. An OFDM transmitter in the AP maps the bits to subcarriers such that the output resembles either an OOK ON or OFF symbol to the receiving client device.

Generally, an 802.11 ba packet includes a header and data. The header corresponds to a conventional 802.11 OFDM header that can be recognized by an 802.11 receiver, including an 802.11ba receiver. The data portion is a strain of OOK symbols that are 4 µs each and typically recognizable only be WUR receivers. For example, to generate an 802.11 packet that resembles an 802.11ba WUR packet, the transmitter formats a packet header to specify a time value indicating a duration for the payload, i.e., the length of the WUR data portion. To generate an 802.11 OFDM symbol that resembles a WUR ON symbol, the transmitter maps high values to a preselected low subcarrier and zero values to the remaining subcarriers. Once passed through an inverse fast Fourier transform (IFFT) component in the transmitter, the resulting time-domain output resembles an all-high value, simulating an ON symbol in OOK modulation.

To generate an 802.11 OFDM symbol packet that resembles an 802.11ba WUR OFF symbol, the transmitter maps a zero value to all subcarriers. After IFFT, the resulting time domain output resembles an all zero value, simulating an OFF symbol in OOK modulation.

Because the resulting packets may yield either a constant high energy (for an ON symbol) or a constant low energy (for an OFF symbol) over the specified duration, the client device that receives such packets can process the packets as WUR packets. Advantageously, this approach provides a software-based solution to supporting 802.11ba WUR operations. That is, no modifications to the hardware of a legacy AP are necessary to communicate with the secondary radio of a WUR-enabled client device, and this approach may be achieved via an update to underlying software (e.g., in a controller of the AP) or firmware of the AP. Therefore, legacy APs may be configured to send packets that simulate OOK symbols to WUR-enabled client devices.

FIG. 1 illustrates an example computing environment 100 including a non-802.11ba wireless access point (AP) that generates packets simulating on-off keying symbols (OOK), according to one embodiment. As shown, the computing environment 100 includes an AP 105 connected with a network 120 (e.g., the Internet) and client devices 110 and 115. In one embodiment, the computing environment 100 corresponds to a setting where the AP 105 provides connectivity to the network 120 for the client devices 110 and 115.

In one embodiment, the client devices 110 and 115 correspond to Internet-of-Things (IoT) devices performing some function within the computing environment 100. For example, the client devices 110 and 115 may include sensors used to collect data for transmission over the network 120 for further processing by a computing system. The client device 110 includes a main radio 112. The client device 115 includes a main radio 117. The main radios 112 and 117 each transmit and receive 802.11 wireless data over the network 120 via the AP 105. The client device 115 represents a networked IoT device that is not enabled for wake-up radio (WUR).

In this example computing environment 100, the client device 110 represents an 802.11ba device that includes a WUR receiver, particularly, a WUR 114. The WUR 114 is a low-power consumption receiver that operates on a narrow band (e.g., 1 MHz, 2 MHz, 5 MHz, etc.), where the target power consumption for the WUR 114 is typically less than 1 mW. Generally, the main radio 112 is in an inactive (or sleep) state when there is no data to send or receive. And the WUR 114 remains active even when the main radio 112 is inactive. The WUR 114 wakes up the main radio 112 when there is a data packet to receive. In particular, the WUR 114 may receive a sequence of WUR packets from an AP. Generally, the format of a WUR packet includes a preamble followed by an OOK modulation signal. Once received, the WUR 114 triggers an active state in the main radio 112.

Illustratively, the AP 105 is a network device that includes a controller 106, a transmitter 108, and a receiver 109. Further, the AP 105 may include a plurality of antennas (not shown) connected to radios associated with the transmitter 108 and the receiver 109. The controller 106 generally provides configuration and management settings for the AP 105. In addition, the controller 106 includes hardware components, such as one or more network processors and a memory. Further still, the controller 106 may host an operation system that executes one or more software applications.

The transmitter 108 and receiver 109 are configured to send and receive packet data over the network 120. In one embodiment, the transceiver 108 and receiver 109 are part of a same radio, e.g., a transceiver. The transmitter 108 and receiver 109 represent an orthogonal frequency division multiplexing (OFDM) transmitter and receiver, respectively. The transmitter 108 sends OFDM communication symbols over a wideband communication channel, the channel comprising one or more subchannels. Each subchannel is frequency-division multiplexed (i.e., separated by frequency) and within a predefined frequency spectrum. Further, the transmitter 108 divides each subchannel into multiple subcarriers. Generally, the receiver 109 demodulates a received signal using fast Fourier transform (FFT).

In one embodiment, the AP 105 implements an 802.11 standard that precedes 802.11ba. For example, the AP 105 may implement an 802.11ac standard. Under such a standard, the AP 105 is unable to directly perform OOK modulation. To address this issue, in one embodiment, the controller 106 includes an WUR packet generator 107. The WUR packet generator 107 includes predefined bit streams used to format an 802.11 packet that simulates an OOK waveform. Thus, a client device interprets this formatted packet as a WUR packet.

Figure 2:
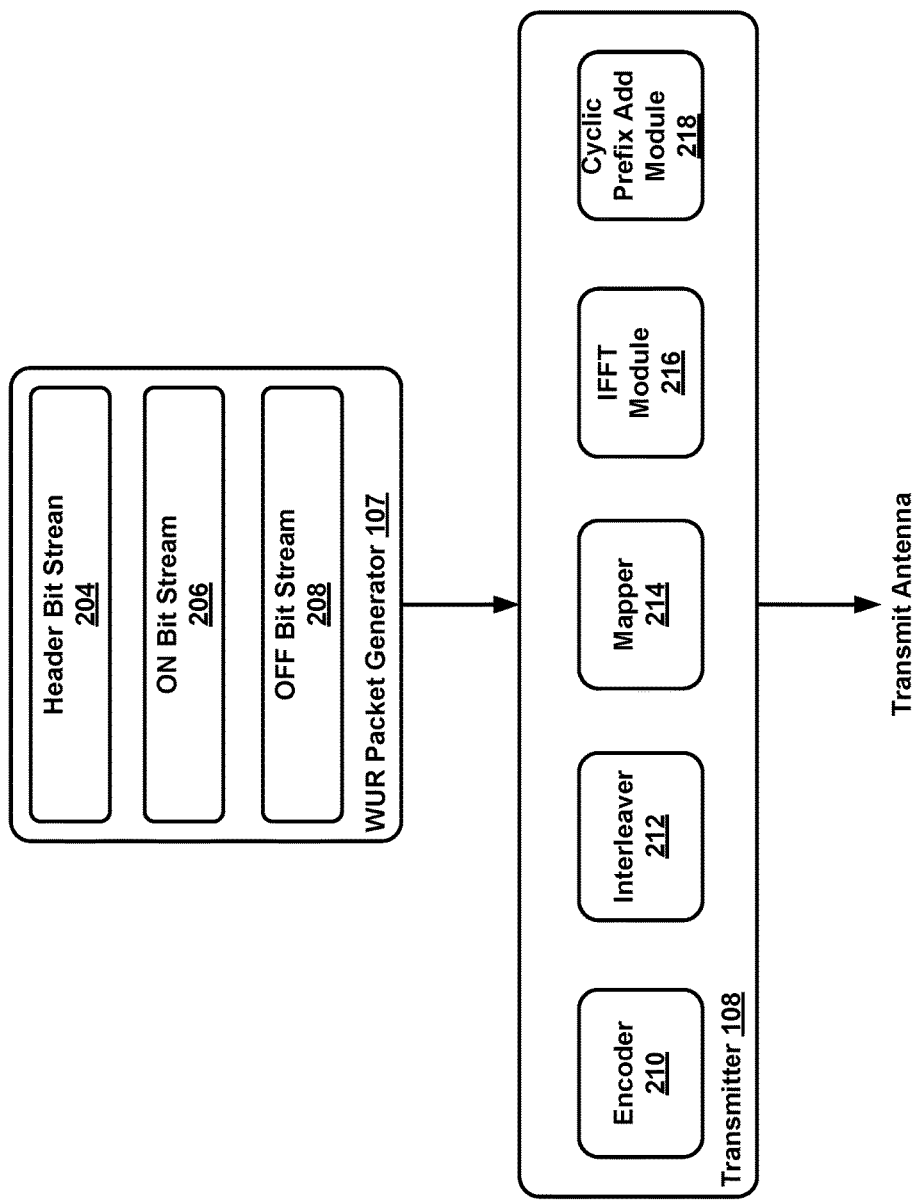
FIG. 2 illustrates components of the non-802.11ba wireless AP described relative to FIG. 1, according to one embodiment.

FIG. 2 illustrates components of the non-802.11ba wireless AP described relative to FIG. 1, according to one embodiment. In particular, FIG. 2 further illustrates a flow between the WUR packet generator 107 and the transmitter 108 in generating a packet simulating an OOK-modulated symbol, e.g., to be sent to an 802.11ba client device as part of a WUR sequence.

In one embodiment, the WUR packet generator 107 generates bits for a WUR packet to encode in a data payload of an 802.11 OFDM packet. As shown, the WUR packet generator 107 provides a header bit stream 204, ON bit stream 206 and an OFF bit stream 208. Each of the bit streams 204, 206, and 208 correspond to a sequence of data bits used to encode a WUR packet header and payload in the 802.11 OFDM packet via the transmitter 108. The transmitter 108 receives the ON bit stream 206 to encode an 802.11 symbol simulating an OOK-modulated symbol for the ON value. Particularly, the ON bit stream 206 maps the non-zero bit values to a select subcarriers of an ODFM symbol. Likewise, the transmitter 108 receives the OFF bit stream 208 to encode an 802.11 symbol simulating an OOK-modulated symbol for the OFF value. And the OFF bit stream 208 maps a zero bit values to all subcarriers of an OFDM symbol. Each of the bit streams 206 and 208 include data bits used to encode a header and payload of the WUR packet that is the resulting OFDM packet payload. Each resulting OFDM symbol of the OFDM payload represents one OOK symbol. In particular, each bit stream 206 and 208 provide a mapping between a simulated ON/OFF WUR symbol to an OFDM. The structure of the packet is described in further detail with regard to FIG. 3.

The WUR packet generator 107 may send the ON bit stream 206 or OFF bit stream 208 to the transmitter 108 based on a WUR packet sequence for a target client device, such as client device 110. A WUR sequence may correspond to any combination of ON and OFF symbols to notify a WUR on the target client device to wake up the main radio on that device.

Illustratively, the transmitter 108 includes an encoder 210, an interleaver 212, a mapper 214, inverse fast Fourier transform (IFFT) module 216, and a cyclic prefix add module 218. The transmitter 108 receives a bit stream (e.g., the ON bit stream 206 or the OFF bit stream 208) as input from the WUR packet generator 107. The encoder 210 applies forward error correcting (FEC) codes to the input bit stream. Doing so results in coded bits that comprise the bit stream. The interleaver 212 arranges the coded bits in a known order, e.g., by populating an interleaver matrix with the coded bits in a specified block size and outputting the contents of the matrix.

In one embodiment, the mapper 214 evaluates the bit stream and maps each bit of the stream to one or multiple subcarriers in a communication channel. Each of the ON bit stream 206 and OFF bit stream 208 is arranged such that high bit values (if present) are mapped to the lowest subcarrier and zero values are mapped to the remaining subcarriers in the channel. For instance, the predefined bits in the ON bit stream 206 may include high (1) values in a position that results in the high values being mapped to the lowest subcarrier. Zero values in the ON bit stream 206 are mapped to the other subcarriers in the channel. For example, given a channel with three subcarriers, a high value is mapped to the lowest subcarrier, and zeros are mapped to the highest and middle subcarriers. As a result, the lowest subcarrier contains energy while the highest and middle subcarriers do not. As another example, the OFF bit stream 208 may include zero values that are mapped to each subcarrier.

The IFFT module 216 converts the subcarriers from a frequency-domain representation to a time-domain symbol representation via IFFT, generating an OFDM symbol. Generally, each of the ON bit stream 206 and OFF bit stream 208 should result in the time-domain representation having a duration of 4 µs, similar to the 4 µs duration of an OOK-modulated symbol. Further, the IFFT process further results in a representation of an all-high or all-zero value over the 4 µs duration. The cyclic prefix add module 218 may include a cyclic extension to reduce inter-symbol interference.

Figure 3:
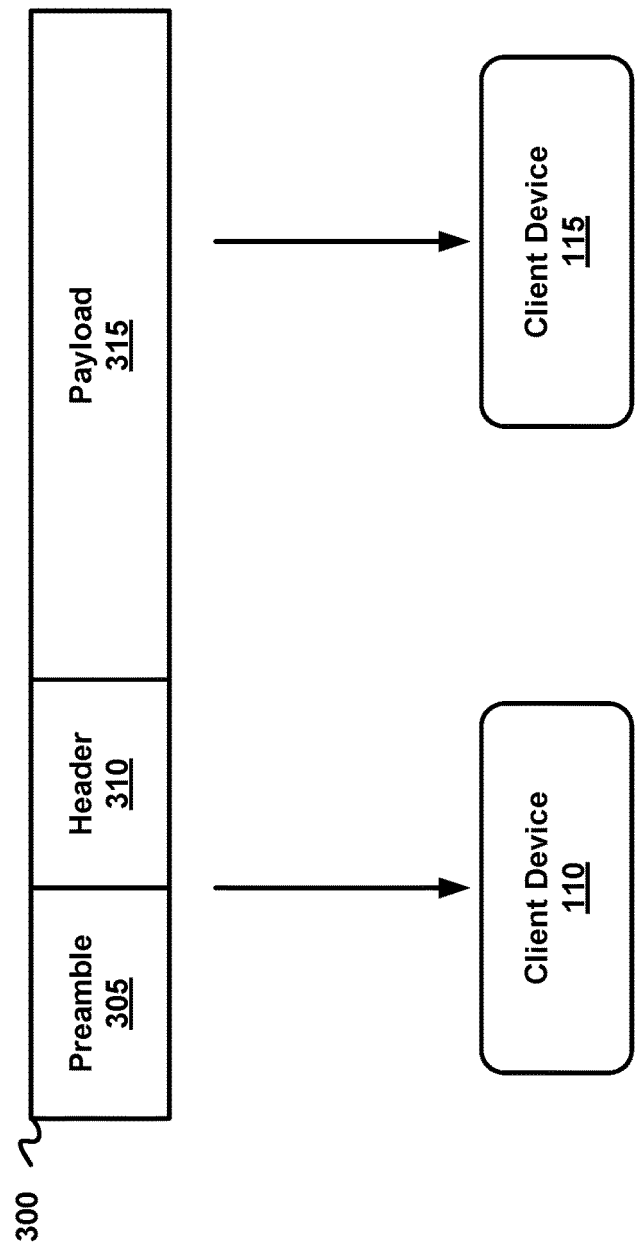
FIG. 3 illustrates an example 802.11 packet including a data payload that simulates an OOK symbol, according to one embodiment.

The transmitter 108 may send a resulting 802.11 packet that includes a data payload resembling an OOK-modulated WUR packet to a target client device. FIG. 3 illustrates an example 802.11 packet 300 including a data payload that simulates a WUR packet, according to one embodiment. Illustratively, the packet 300 includes a preamble 305, a header 310, and a payload 315.

The preamble 305 includes sequences for automatic gain control (e.g., to reduce distortion) and frequency and timing synchronization (e.g., to minimize non-coherent detection error). The preamble 305 may also include identification for the AP 105 as well as identification for a target station or group.

The header 310 corresponds to a valid 802.11 header. The header 310 specifies information relating to the structure of the packet, such as packet length, code rate, and check sequences. The header 310 also specifies an address of the device to receive the packet and whether the payload includes a simulated WUR packet. Further, the header 310 specifies a duration of the payload. In one embodiment, the specified duration is 4 µs*N (where N is the number of simulated symbols included in the payload) to simulate the duration of an OOK-modulated WUR packet.

The payload 315 includes an OFDM signal that comprises data symbols simulating a stream of OOK-modulated ON or OFF symbols of a WUR signature sequence. A signature sequence includes a number of random ON (1) or OFF (0) values (e.g., based on a Barker sequence, a pseudorandom sequence, etc.). A WUR-enabled client device uses the signature sequence to claim a WUR packet. Advantageously, because the values mapped to the subcarriers yield an all-high or all-low output after IFFT processing, the data in the payload 315 resembles a stream of OOK-modulated symbols for the signature sequence, and thus, can be detected by a WUR in a client device.

Illustratively, FIG. 3 also depicts an example case where a client device 110 and client device 115 detect the packet 300 in the network. In this example, assume that the packet 300 is directed to the client device 110. As stated, client device 110 is a WUR-enabled device that includes a secondary radio (WUR 114) to wake up a main radio 112 in the client device 110. And client device 115 includes a main radio but not a wake-up radio.

In this example, the client device 115 detects the packet 300 over the network. Similarly, other devices in the network other than client device 110 may evaluate the packet header 310 for destination address information and the like, and in turn disregard the packet 300. At any rate, 802.11 client devices recognize the packet 300 as a valid packet.

Continuing the example, the client device 110 may detect and receive the packet at the WUR 114. The WUR 114 may detect the presence of a WUR signature sequence in the payload 315 given the specified duration and the content of the payload 315. From the signature sequence, the WUR 114 may determine a data rate for decoding the packet. Once decoded, the WUR 114 may send a wake-up signal to the main radio 112 to trigger an active state therein.

Figure 4:
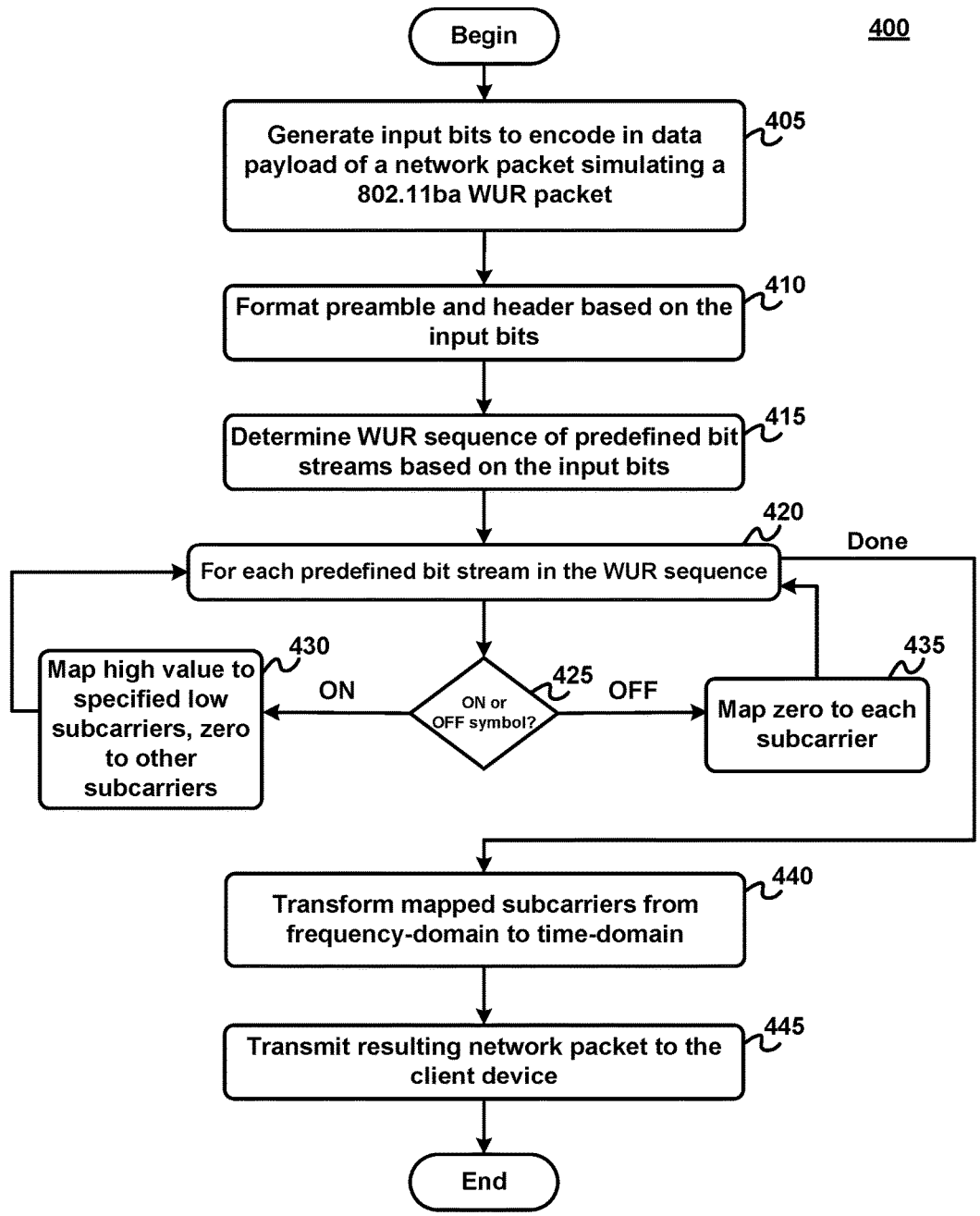
FIG. 4 illustrates a method for simulating an OOK symbol via a non-802.11ba wireless AP, according to one embodiment.

FIG. 4 illustrates a method 400 for simulating an OOK symbol via a non-802.11ba wireless AP, according to one embodiment. For example, method 400 may be initiated in response to the AP 105 determining that data needs to be transmitted to a WUR-enabled device. As shown, method 400 begins at step 405, where the WUR packet generator 107 generates input bits to encode in a data payload of an OFDM network packet, where the payload simulates an 802.11ba WUR packet. In particular, the WUR packet generator 107 may send input data bits used to simulate a header (e.g., header bit stream 204) for the WUR packet as well as simulate an ON symbol or an OFF symbol to realize each OOK symbol in the packet to the transmitter 108.

At step 410, the transmitter 108 formats the preamble and header to be encoded in the payload based on the input data bits. For instance, the transmitter 108 may encode sequences for automatic gain control and time/frequency synchronization based on the header bit stream. Further, the transmitter 108 may encode information relating to the structure of the packet in the header and also specify a duration of the payload (e.g., N*4 μs, where N represents an amount of simulated OOK-modulated symbols in the payload).

At step 415, the transmitter 108 determines a WUR sequence of the predefined bit streams based on the input data bits. For instance, a 1 value in the input data bits may correspond to the ON bit stream 206. Further, a 0 value in the input data bits may correspond to the OFF bit stream 208. The transmitter 108 may select each of the ON bit stream 206 and OFF bit stream 206 based on the determined WUR sequence.

Further still, the transmitter 108 encodes the formatted preamble, header, and predefined bit streams of the WUR sequence. More specifically, the transmitter 108 passes the input bit stream through the encoder 210 and interleaver 212 to format the data bits for further processing. In addition, the transmitter 108 may also perform scrambling on the data bits. At any rate, the data bits in the bit stream are defined in a way that results in, after mapping the lowest subcarrier having high energy and other subcarriers having little to no energy for an ON value, and the subcarriers having little to no energy for an OFF value.

At step 420, the method 400 enters a loop for steps 425 through 425. At step 425, the transmitter 108 determines whether the predefined bit stream corresponds to an ON symbol (i.e., corresponds to ON bit stream 206) or an OFF symbol (i.e., corresponds to OFF bit stream 208). If the predefined bit stream corresponds to an ON symbol, then at step 430, the mapper 214 maps a high value to select low subcarriers in a communication subchannel, and maps zero to the other subcarriers. Otherwise, if the predefined bit stream corresponds to an OFF symbol, then at step 435, the mapper 214 maps zero to each subcarrier on the subchannel.

At step 440, the IFFT module 216 transforms the mapped subcarriers to a time-domain representation. IFFT is performed on the mapped subcarriers and results in a combination of all-high OFDM symbols (for a packet corresponding to the ON bit stream) and/or all-zero OFDM symbols (for a packet corresponding to the OFF bit stream) in the time-domain for 4 μs (multiplied by the number of simulated OOK symbols), based on the WUR sequence. Because each symbol is either all-high or all-zero for a 4 μs duration, each symbol resembles an OOK-modulated symbol that is detectable by a WUR. At step 440, the transmitter 108 sends the resulting packet to the WUR-enabled client device. The client device may, in turn, interpret the packet as a WUR packet and wake up the main radio.

In another embodiment, the method 400 can be carried out in the absence of encoding, interleaving, and scrambling (i.e., bypassing the encoding of the bit stream portion of step 410). That is, the transmitter 108 may map the bits of the input bit stream to the subcarriers directly. Doing so provides a straightforward approach to determining which subcarriers have energy. The firmware of the AP 105 would be modified to bypass the encoder and interleaver in instances where a packet simulating an OOK symbol is generated.

Figure 5:
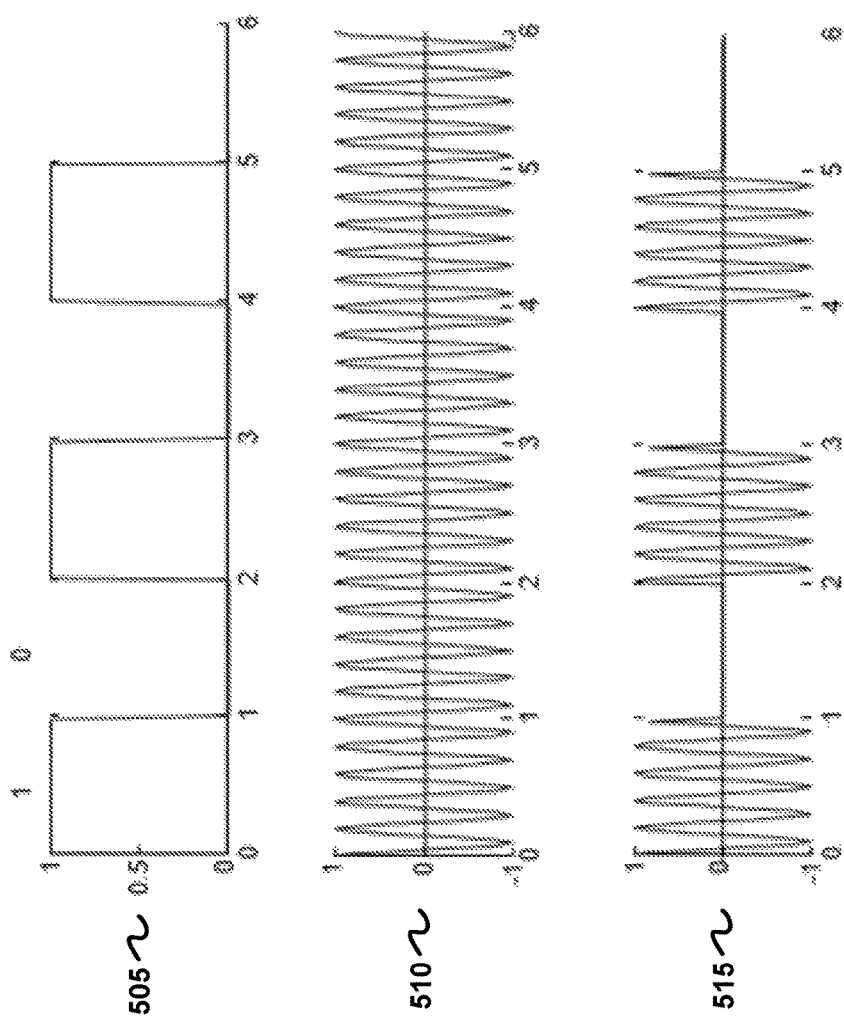
FIG. 5 illustrates an example plot diagram for outputting typical OOK symbols, according to one embodiment.

FIG. 5 illustrates an example plot diagram for output typical OOK symbols, according to one embodiment. Illustratively, FIG. 5 depicts plots 505, 510, and 515.

In one embodiment, plot 505 represents a bit stream to transmit. Illustratively, a 1 bit value is represented on the plot 505 by a higher amplitude and a 0 bit value is represented by a lower amplitude. The plot 510 represents the carrier wave in the transmitter 108. The carrier can be divided into multiple subcarriers into which data can be modulated and then transmitted. In this example, the data bits from the plot 505 are mapped to subcarriers of the carrier shown in plot 510. As stated, a 1 bit value is mapped to the lowest subcarrier and a 0 bit value is mapped to other subcarriers.

The plot 515 represents the OOK-modulated output resulting from the mapping of the data bits depicted in plot 505 to subcarriers of the carrier depicted in plot 510. Illustratively, the transmission of a 0 bit value coincides with a flat line of magnitude 0.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments.

Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., such as the OOK packet generator) or related data available in the cloud. For example, the OOK packet generator could execute on a computing system in the cloud and provide predefined bit streams used to encode 802.11 packets with data simulating OOK-modulated symbols. In such a case, the OOK packet generator could store the predefined bit stream data at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   mapping, by a wireless access point that implements a non-802.11ba standard that is not configured to perform on-off key (OOK) modulation, at least a first data bit of a predefined bit stream that includes a plurality of data bits to a first subcarrier of a plurality of subcarriers, wherein the predefined bit stream is associated with an ON OOK-modulated symbol, wherein the first data bit is a high value, and wherein the first subcarrier is a lowest subcarrier in a subchannel;
   encoding, in a data payload of a network packet, a symbol based on the mapping of the first data bit to the first subcarrier, wherein the symbol simulates an OOK-modulated symbol in a wake-up radio (WUR) sequence; and
   transmitting the network packet to a client device.

2. The method of claim 1, wherein the wireless access point implements an 802.11 standard that precedes 802.11ba.

3. The method of claim 1, further comprising:
mapping a low bit value to each of the subcarriers other than the lowest of the plurality of subcarriers.

4. The method of claim 1, wherein the predefined bit stream is associated with an OFF OOK-modulated symbol.

5. The method of claim 4, further comprising:
mapping a low bit value to each of the plurality of subcarriers.

6. The method of claim 1, wherein the client device is a WUR-enabled Internet-of-Things device.

7. A non-transitory computer-readable medium storing instructions, which, when executed on the processor, performs an operation comprising:
mapping, by a wireless access point that implements a non-802.11ba standard that is not configured to perform on-off key (OOK) modulation, at least a first data bit of a predefined bit stream that includes a plurality of data bits to a first subcarrier of a plurality of subcarriers, wherein the predefined bit stream is associated with an ON OOK-modulated symbol, wherein the first data bit is a high value, and wherein the first subcarrier is a lowest subcarrier in a subchannel;
encoding, in a data payload of a network packet, a symbol based on the mapping of the first data bit to the first subcarrier, wherein the symbol simulates an OOK-modulated symbol in a wake-up radio (WUR) sequence; and
transmitting the network packet to a client device.

8. The non-transitory computer-readable medium of claim 7, wherein the wireless access point implements an 802.11 standard that precedes 802.11ba.

9. The non-transitory computer-readable medium of claim 8, wherein the operation further comprises:
mapping a low bit value to each of the subcarriers other than the lowest of the plurality of subcarriers.

10. The non-transitory computer-readable medium of claim 7, wherein the predefined bit stream is associated with an OFF OOK-modulated symbol.

11. The non-transitory computer-readable medium of claim 10, wherein the operation further comprises:
mapping a low bit value to each of the plurality of subcarriers.

12. The non-transitory computer-readable medium of claim 7, wherein the client device is a WUR-enabled Internet-of-Things device.

13. A network device, comprising:
a transmitter configured to:
map at least a first data bit of a predefined bit stream that includes a plurality of data bits to a first subcarrier of a plurality of subcarriers, wherein the network device implements a non-802.11ba standard that is not configured to perform on-off key (OOK) modulation, wherein the predefined bit stream is associated with an ON OOK-modulated symbol, wherein the first data bit is a high value, and wherein the first subcarrier is a lowest subcarrier in a subchannel,
encoding, in a data payload of a network packet, a symbol based on the mapping of the first data bit to the first subcarrier, wherein the symbol simulates an OOK-modulated symbol in a wake-up radio (WUR) sequence, and
transmitting the network packet to a client device.

14. The network device of claim 13, wherein the network device is a wireless access point that implements an 802.11 standard that precedes 802.11ba.

15. The network device of claim 14, wherein the transmitter is further configured to:
map a low bit value to each of the subcarriers other than the lowest of the plurality of subcarriers.

16. The network device of claim 13, wherein the predefined bit stream is associated with an OFF OOK-modulated symbol.

17. The network device of claim 16, wherein the transmitter is further configured to:
map a low bit value to each of the plurality of subcarriers.

* * * * *